United States Patent [19]

Miller et al.

[11] Patent Number: 5,118,077
[45] Date of Patent: Jun. 2, 1992

[54] PULSE WIDTH MODULATED SOLENOID VALVE FOR VARIABLE DISPLACEMENT CONTROL

[75] Inventors: Craig A. Miller, Rockford; Tibor Baron; Terry L. Forbes, both of Dixon, all of Ill.

[73] Assignee: Borg-Warner Automotive Electronic & Mechanical Systems Corporation, Sterling Heights, Mich.

[21] Appl. No.: 742,747

[22] Filed: Aug. 9, 1991

[51] Int. Cl.$^5$ .............................. F16K 31/06
[52] U.S. Cl. ...................... 251/129.15; 251/129.14; 251/129.18
[58] Field of Search ............ 251/129.15, 129.18, 251/129.14, 129.19

[56] References Cited

U.S. PATENT DOCUMENTS

| | | | |
|---|---|---|---|
| 3,805,203 | 4/1974 | Deckard | 251/129.14 X |
| 4,218,669 | 8/1980 | Hitchcock et al. | 251/129.14 |
| 4,725,039 | 2/1988 | Kolchinsky | 251/129.15 |

Primary Examiner—Arnold Rosenthal
Attorney, Agent, or Firm—Harness, Dickey & Pierce

[57] ABSTRACT

A balanced valve system, employing either spool or ball valve members can be pulse width modulated using a solenoid actuator. The solenoid actuator is integrally assembled onto the valve and has a rod by which the solenoid armature imparts a valve operating force to the spool or ball valve member. The rod is press fit into the armature during assembly to establish the desired air gap spacing between armature and pole piece. Movement of the armature causes a corresponding movement in the rod which urges the valve member against compression spring forces to the open or unseated position.

1 Claim, 3 Drawing Sheets

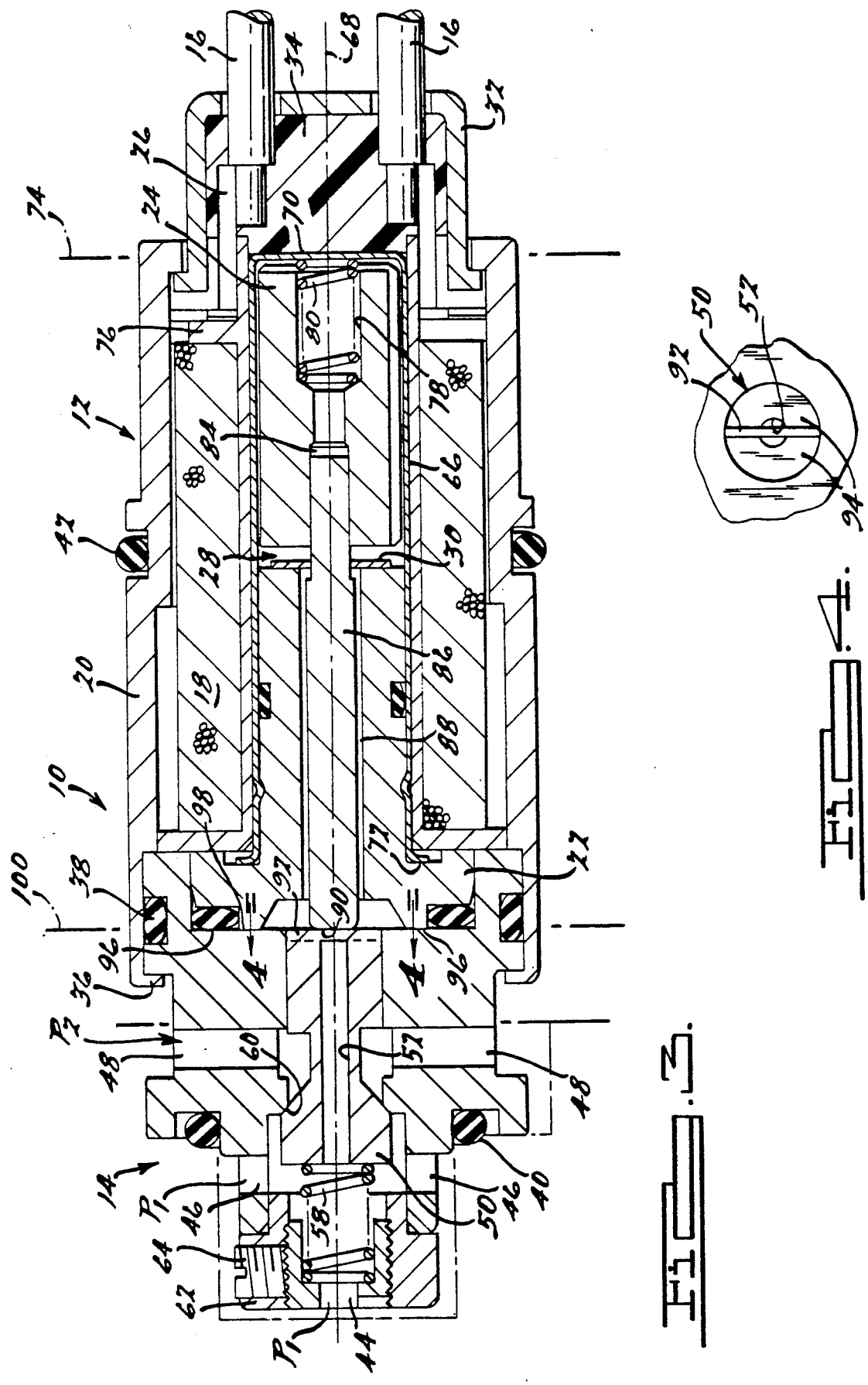

PULSE WIDTH MODULATED SOLENOID VALVE FOR VARIABLE DISPLACEMENT CONTROL

BACKGROUND AND SUMMARY OF THE INVENTION

The present invention relates generally to solenoid valves and more particularly to a pulse width modulated solenoid valve for variable displacement control and which is suitable for use in electronically controlled air conditioning compressors.

Control of displacement in automotive air conditioning compressors has conventionally been accomplished using a mechanical control. In order to replace the mechanical control with an efficient electronic control it would be desirable to utilize a pulse width modulated solenoid valve. However, the input pressure of the Freon oil mixture is typically between 30 and 350 psi and presently available solenoid valves capable of operating at these pressure ranges under automotive environmental conditions are quite expensive. To be practical for use in mass produced vehicles, the solenoid valve must be manufacturable to very close tolerances and yet must be economical. Currently available valves are generally deficient in this regard.

The present invention provides an economical valve which is well suited to the automotive air conditioning compressor control application. It employs a unique construction in which the critical air gap tolerances are readily adjusted during manufacture with a minimal number of manufacturing steps and using a minimal number of parts. Unlike conventional valves in which a large number of components are stacked together, each contributing to tolerance variations, the present valve is constructed so that the critical gap dimension is established by a simple length adjustment of a rod and armature assembly. By this simple adjustment, the individual components which make up the valve no longer contribute to cumulative tolerance variations. Thus the valve of the invention is easy to manufacture without a great deal of high tolerance manufacturing steps.

According to one aspect of the invention the solenoid valve comprises a tubular housing which defines a longitudinal axis and which has a substantially closed end that defines a first reference plane. The first reference plane is generally orthogonal to the longitudinal axis. The tubular housing also has a substantially open end, opposite the closed end. A solenoid coil is disposed about the tubular housing for producing an electromagnetic force. An armature is slidably disposed in the tubular housing for longitudinal movement along the longitudinal axis. The armature has a first face that is adjacent the substantially closed end and a second face that faces the substantially open end.

A pole piece member, at least partially disposed on and preferably inserted into the tubular housing, covers the substantially open end. The pole piece member has a longitudinal passageway in axial alignment with the longitudinal axis. The pole piece member further has an alignment face which defines a second reference plane generally orthogonal to the longitudinal axis. A first spring is compressibly disposed between the closed end of the tubular housing and the adjacent armature face. The spring urges the armature towards the pole piece.

A longitudinal rod of a predetermined length is slidably disposed in the longitudinal passageway of the pole piece. The rod is secured to the armature by a means which permits the combined longitudinal length of the rod and the armature to be adjusted to a predetermined controlled dimension. In the presently preferred embodiment a press fit is used between the longitudinal rod and the armature.

The solenoid valve further comprises a solenoid housing for carrying the pole piece and the tubular housing so that the alignment face of the pole piece member faces longitudinally outwardly. Secured to the solenoid housing is a valve structure which has an alignment face disposed for registration with the alignment face of the solenoid housing to thereby establish a fixed spatial relationship between the valve and the pole piece and to thereby establish a fixed spacing between the first reference plane and the second reference plane. The valve may include a valve seat, a movable valve member for registration with the valve seat and a second spring for urging the valve member into contact with the valve seat.

The longitudinal rod extending from the armature has an end that is disposed in force imparting communication with the valve member. The armature is responsive to electromagnetic forces of the solenoid coil to produce longitudinal movement of the longitudinal rod. The rod thus imparts longitudinal forces to the valve member and these forces tend to compress the second spring causing the valve member to move to an unseated or open position.

For a more complete understanding of the invention, its objects and advantages, reference may be had to the following specification and to the accompanying drawings.

BRIEF DESCRIPTION OF THE DRAWINGS

FIG. 3 is a cross-sectional view of a third embodiment of the invention; and

FIG. 4 is a cross-sectional view of the valve of FIG. 3 taken substantially through the reference plane 100.

DESCRIPTION OF THE PREFERRED EMBODIMENTS

Figure 1:
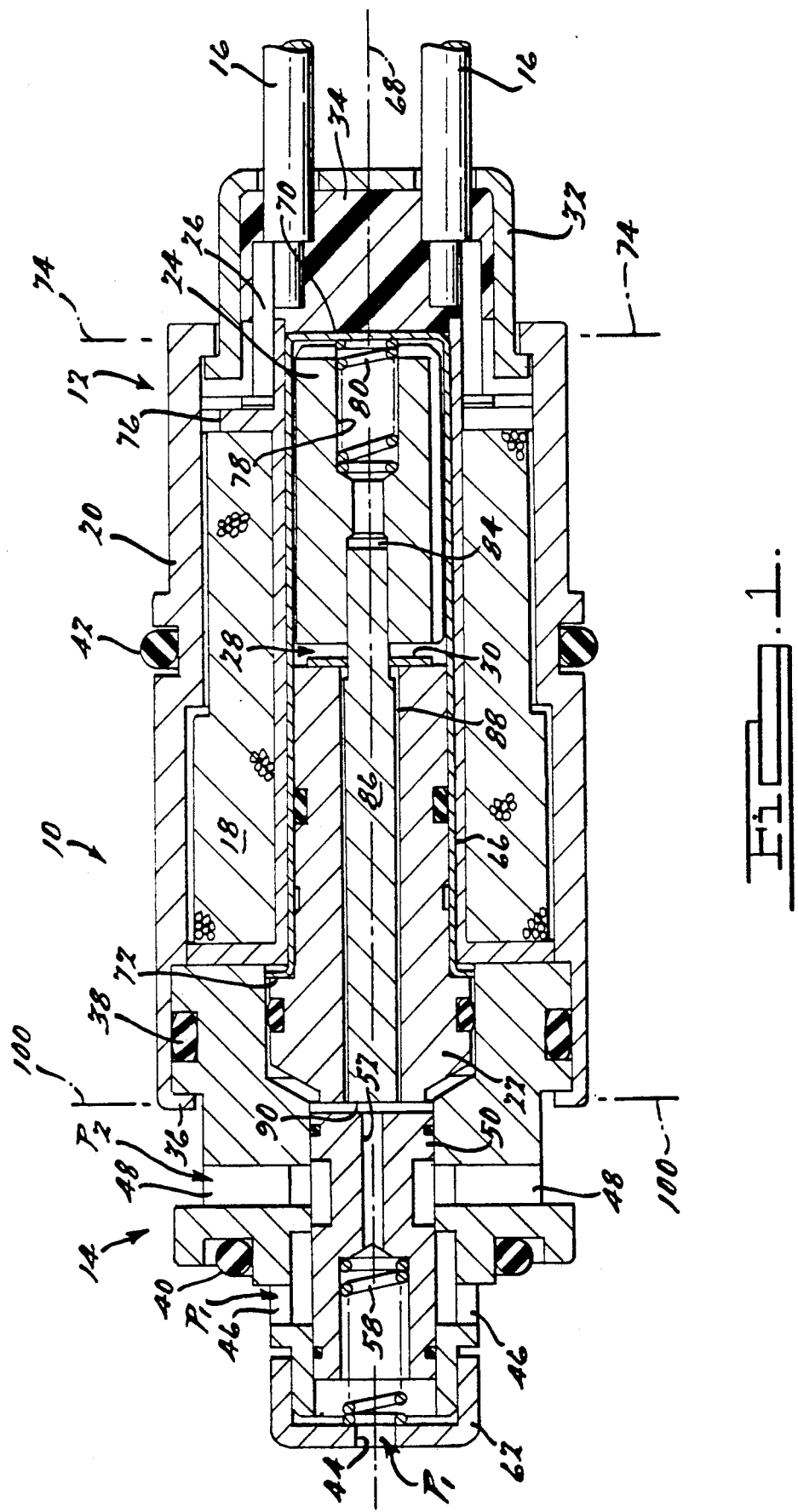
FIG. 1 is a cross-sectional view of a first embodiment of the invention.

Referring to FIG. 1, a first embodiment of the v solenoid valve is shown generally at 10. The solenoid valve comprises a solenoid portion 12 and a valve portion 14. Electrical leads 16 supply electrical current to the solenoid coil 18 of the solenoid portion. As illustrated, the solenoid portion includes a magnetic housing 20, a pole piece 22 and an armature 24. When electrical current is supplied through the leads 16 via electrical terminals 26 to the solenoid coil 18, a magnetic field is established in a circuit through the housing 20, pole piece 22 and armature 24. The magnetic field produces an electromagnetic force which causes the armature 24 to move in a direction tending to close the air gap 28 located generally between the pole piece 22 and the armature 24. In the preferred embodiment a disk of nonmagnetic material 30 is disposed in the air gap 28 to alter the electromagnetic force and thereby alter (e.g., increase) the response time of the valve. The use of this nonmagnetic disk has been found to be beneficial in the application of the subject solenoid valve in an electronically controlled air conditioner compressor. It is possible that in some applications, the nonmagnetic disk may be eliminated to increase the valve response time as desired.

The solenoid portion 12 is preferably fabricated as a self-contained unit which has a plastic insulator cap 32 which has been internally potted with epoxy 34 after the electrical leads 16 have been soldered to the terminals 26. Similarly, the valve portion 14 is likewise preferably constructed as a self-contained unit. The self-contained solenoid and valve units are then longitudinally aligned and assembled together, being held together as by crimping over fingers 36 on housing 20. As illustrated the valve portion includes an O-ring seal 38 adjacent the junction where the solenoid and valve portions are joined. In an air conditioning compressor application it may also be desirable to include external O-rings 40 and 42, which are adapted to seal the valve within its intended operating environment.

The valve portion 14 illustrated in FIG. 1 comprises a first embodiment of a balanced system valve which includes two $P_1$ ports, an axial port 44 and a radial port 46 and a $P_2$ port, radial port 48. The valve includes a spool member 50 having a longitudinal axial passageway 52 which places both sides of the spool at pressure $P_1$, thereby establishing a balanced system. Similarly, the valves of FIGS. 2 and 3 also have both axial and radial $P_1$ ports and a $P_2$ port to define a balanced system.

Figure 2:
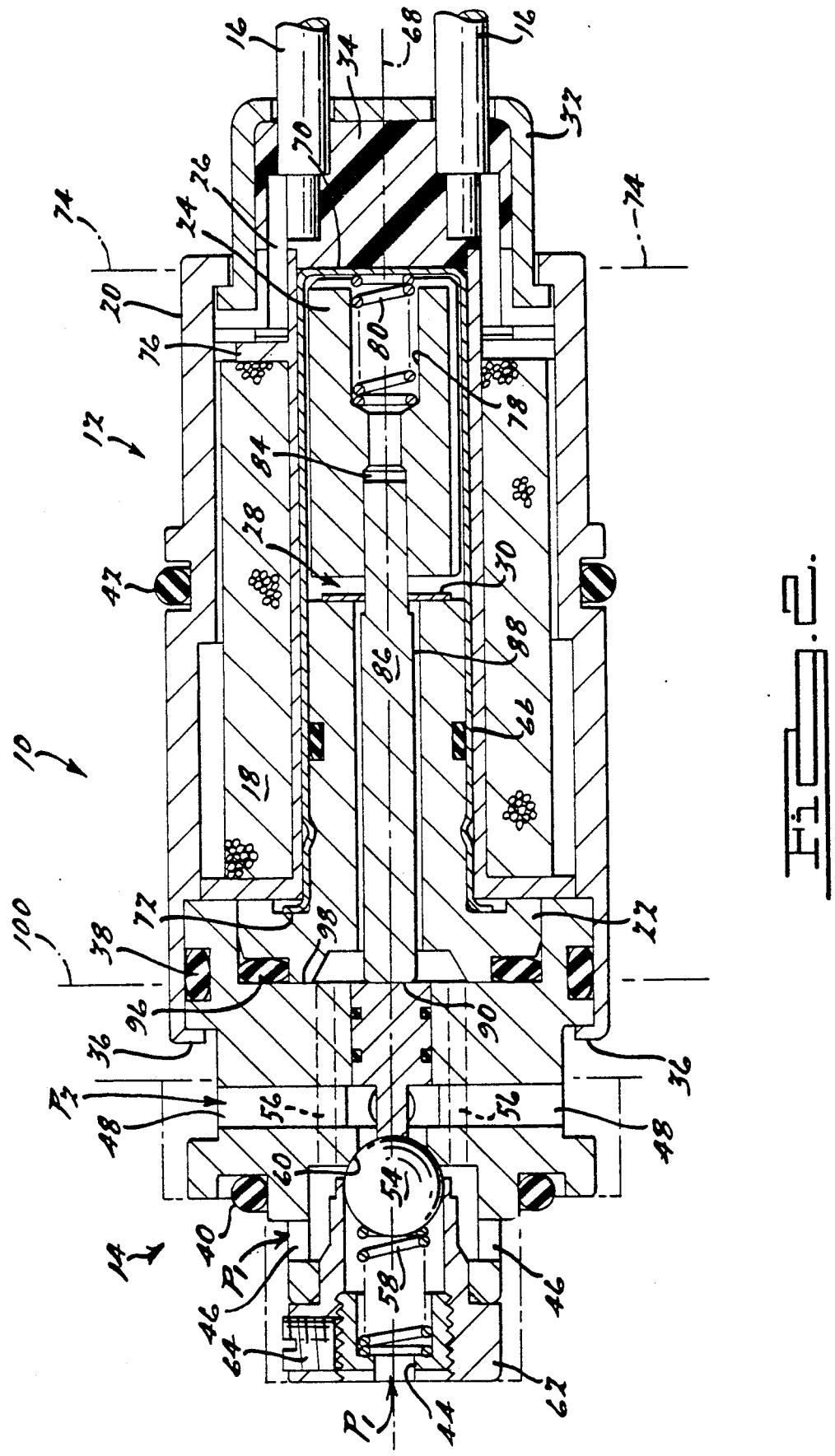
FIG. 2 is a cross-sectional view of a second embodiment of the invention.

As illustrated, the valve embodiment of FIG. 2 employs a ball valve member 54 while the embodiment of FIG. 3 employs another form of spool member 56 having a conical taper. Each of these valve members has a longitudinally extending passageway or passageways which establish communication from one side of the valve to the other to effect a balanced system. The embodiment of FIG. 2 has a plurality of longitudinal passageways 56 (shown in dotted lines) which communicate $P_1$ pressure to both sides of the ball valve member. The embodiment of FIG. 3 utilizes an axial passageway 52, similar to the passageway of the embodiment of FIG. 1.

The three presently preferred valve portions of FIGS. 1–3 also each preferably include a spring 58 for acting on the valve member (spool member 50 or ball valve member 54, depending on the embodiment). This spring member forces the valve member into its closed position. In the embodiments of FIGS. 2 and 3 the valve member is forced by spring 58 onto a valve seat 60. In the embodiment of FIG. 1 the spool member 50 is urged by spring 58 to a position in which there is no fluid communication between the $P_1$ ports and the $P_2$ port. In order to allow the spring pressure on the valve member to be adjusted, the preferred valve portion includes a threaded end cap 62 which can be threadedly advanced or retracted to change the compression of spring 58. Once the proper compression is established, a set screw 64 is used to lock the end cap in place. (Set screw 64 is not visible in the cross-sectional view of FIG. 1 due to the angle at which the cross-section has been taken.)

With focus now on the solenoid portion 12 of each embodiment, there is a tubular housing 66, preferably fabricated of stainless steel, which supports the armature and embraces the pole piece member. This tubular housing defines a longitudinal axis 68 and has a substantially closed end 70 and a substantially open end 72. The closed end defines a first reference plane 74 which is generally orthogonal to longitudinal axis 68. As seen, the solenoid coil 18 is wound around a bobbin 76 which is assembled around tubular housing 66.

The armature 24 has a first axial bore 78 in its first face containing a compression spring so. Spring 80 is compressibly disposed between the closed end of the tubular housing 66 and the armature. Spring 80 thus urges the armature in a direction towards the pole piece and thus takes up any gap or tolerance. The armature has a second axial bore 84 in its second face and into which a rod 86 is compressibly inserted and secured by friction fit. Rod 86 extends through a longitudinal passageway 88 in pole piece 22. The end 90 of the rod contacts the spool member 50 or ball valve member 54 to impart longitudinal forces to the valve member when the armature is electromagnetically energized. In the presently preferred embodiments the rod end makes physical contact with the spool member 50 or ball valve member 54 to thereby move the spool member or ball valve member to an unseated or open position in which communication is established between $P_1$ and $P_2$. As seen in FIG. 4, the spool member 50 of the FIG. 3 embodiment has a raised wall 92 by which rod end 90 makes physical contact with spool member 50. As seen in FIG. 4, the spool member embodiment of FIG. 3 employs recessed portions 94 on both sides of the raised wall to allow fluid communication through passageway 52 to establish $P_1$ pressure on both sides of the spool member.

Regardless of which embodiment of valve portion is employed, the present construction is quite easy to assemble without the necessity of expensive and time-consuming machining steps. This is done by press fit of the rod 86 into the armature until the combined length of rod and armature is accurately set to the desired predetermined length. The components are then assembled into the tubular housing and the pole piece is secured to the housing. In the FIGS. 2 and 3 embodiments, the exterior face 96 of the pole piece defines an alignment face which is adapted for registration with the alignment face 98 of the valve portion. These abutting faces establish a fixed spatial relationship between the valve portion and the pole piece which in turn establishes a fixed spacing between the first reference plane 74 and a second reference plane 100 passing through the abutting faces 96 and 98.

From the foregoing it will be understood that the present solenoid valve construction, as exemplified by the embodiments of FIGS. 1–3, makes it quite easy to establish the proper air gap spacing, by simply press fitting the armature onto the rod until the desired overall length is achieved. If desired, a feeler gauge can be placed between the armature 24 and disk 30 and the armature then press fit onto the rod while the pole piece face 96 and rod end 90 are resting on a flat surface. In this way, the proper air gap can be set for the desired valve response.

While the invention has been described in its presently preferred embodiments, it will be understood that modifications to the embodiments disclosed can be made without departing from the spirit of the invention as set forth in the appended claims.

What is claimed is:
1. A solenoid valve comprising:
   a tubular housing defining a longitudinal axis and having a substantially closed end defining a first reference plane generally orthogonal to said longitudinal axis and having a substantially open end opposite said substantially closed end;
   a solenoid coil disposed about said tubular housing for producing an electromagnetic force;

an armature slidably disposed in said tubular housing for longitudinal movement along said longitudinal axis, said armature having a first face adjacent said substantially closed end and a second face facing said substantially open end;

a pole piece member at least partially disposed on said tubular housing and covering said substantially open end, said pole piece member having a longitudinal passageway in axial alignment with said longitudinal axis;

said pole piece member further having a first alignment face which defines a second reference plane generally orthogonal to said longitudinal axis;

a first spring means compressibly disposed between said substantially closed end and said first face for urging said armature towards said pole piece;

a longitudinal rod of a predetermined length slidably disposed in said longitudinal passageway and secured to said armature by means permitting the combined longitudinal length of said rod and said armature to be adjusted to a predetermined controlled dimension;

a solenoid housing for carrying said pole piece member and said tubular housing so that said first alignment face faces longitudinally outwardly;

a valve means secured to said solenoid housing, said valve means having a second alignment face disposed for registration with said first alignment face to thereby establish a fixed spatial relationship between said valve means and said pole piece and thereby establishing a fixed spacing between said first reference plane and said second reference plane;

said valve means including a valve seat, a movable valve member for registration with said valve seat and a second spring means for urging said valve member into contact with said valve seat;

said longitudinal rod having an end disposed in force imparting communication with said valve member;

said armature being responsive to said electromagnetic forces to produce longitudinal movement of said longitudinal rod and to thereby impart longitudinal forces from said rod to said valve member, said longitudinal forces acting tending to compress said second spring means and move said valve member to an unseated position.

* * * * *